United States Patent
Balduzzi et al.

(10) Patent No.: US 9,589,058 B2
(45) Date of Patent: Mar. 7, 2017

(54) METHODS AND SYSTEMS FOR SOCIAL MATCHING

(71) Applicant: SameGrain, Inc., Stevensville, MD (US)

(72) Inventors: Anne Artmeier Balduzzi, Stevensville, MD (US); Eric Eller, Bel Air, MD (US)

(73) Assignee: Samegrain, Inc., Stevensville, MD (US)

(*) Notice: Subject to any disclaimer, the term of this patent is extended or adjusted under 35 U.S.C. 154(b) by 225 days.

(21) Appl. No.: 14/056,036

(22) Filed: Oct. 17, 2013

(65) Prior Publication Data

US 2014/0114965 A1  Apr. 24, 2014

Related U.S. Application Data

(60) Provisional application No. 61/715,979, filed on Oct. 19, 2012.

(51) Int. Cl.
 *G06F 7/00* (2006.01)
 *G06F 17/30* (2006.01)
 *G06Q 50/10* (2012.01)

(52) U.S. Cl.
 CPC .. *G06F 17/30867* (2013.01); *G06F 17/30386* (2013.01); *G06F 17/30879* (2013.01); *G06Q 50/10* (2013.01)

(58) Field of Classification Search
 None
 See application file for complete search history.

(56) References Cited

U.S. PATENT DOCUMENTS

| 6,061,681 | A * | 5/2000 | Collins | G06Q 30/08 |
| 6,108,645 | A * | 8/2000 | Eichstaedt | G06F 17/30867 707/741 |
| 6,504,920 | B1 * | 1/2003 | Okon | H04M 3/42008 379/111 |
| 6,519,629 | B2 * | 2/2003 | Harvey | A63F 13/12 709/203 |
| 6,618,593 | B1 | 9/2003 | Drutman et al. | |
| 7,451,161 | B2 | 11/2008 | Zhu et al. | |
| 7,552,060 | B2 | 6/2009 | Vest | |
| 7,592,910 | B2 | 9/2009 | Tuck et al. | |
| 8,019,692 | B2 | 9/2011 | Rosen | |
| 8,060,463 | B1 * | 11/2011 | Spiegel | G06Q 30/02 707/609 |

(Continued)

OTHER PUBLICATIONS

Hitsch et al., "Matching and Sorting in Online Dating", The American Economic Review, vol. 100, No. 1, pp. 130-163, Mar. 2010, American Economic Association.*

(Continued)

*Primary Examiner* — Michael Hicks

(57) ABSTRACT

Methods and systems are provided for triggering a social match analysis. A user device such as a network connected device scans for one or more entity identifiers via camera, microphone, or wireless signal receiver and initiates a request to a social matching system. The social matching system retrieves attribute information for each of the identified entities and performs a match analysis, scoring the potential matches and noting common attributes. A match analysis report is generated and returned to the originating requesting user device.

16 Claims, 6 Drawing Sheets

(56) References Cited

U.S. PATENT DOCUMENTS

| | | |
|---|---|---|
| 8,060,573 B2 | 11/2011 | Leonard |
| 8,108,414 B2 | 1/2012 | Stackpole |
| 8,117,272 B1 | 2/2012 | Leonard |
| 8,150,778 B2 | 4/2012 | Zhu et al. |
| 8,156,064 B2 | 4/2012 | Brown |
| 8,195,673 B2 * | 6/2012 | Wilf .................. G06Q 10/10 707/732 |
| 8,284,990 B2 | 10/2012 | Ma et al. |
| 8,473,440 B2 | 6/2013 | Brown |
| 8,538,895 B2 | 9/2013 | Appelman et al. |
| 2004/0260781 A1 * | 12/2004 | Shostack et al. ............. 709/207 |
| 2005/0246317 A1 | 11/2005 | Turner et al. |
| 2006/0247940 A1 | 11/2006 | Zhu et al. |
| 2007/0050354 A1 | 3/2007 | Rosenberg |
| 2008/0086261 A1 | 4/2008 | Robinson et al. |
| 2009/0215469 A1 | 8/2009 | Fisher et al. |
| 2010/0125632 A1 | 5/2010 | Leonard |
| 2010/0313142 A1 | 12/2010 | Brown |
| 2011/0028129 A1 | 2/2011 | Hutchison et al. |
| 2011/0138305 A1 | 6/2011 | Akai et al. |
| 2011/0211737 A1 | 9/2011 | Krupka et al. |
| 2011/0238755 A1 | 9/2011 | Khan et al. |
| 2013/0066821 A1 | 3/2013 | Moore et al. |
| 2013/0196690 A1 | 8/2013 | Crowley et al. |
| 2013/0227020 A1 | 8/2013 | Ruffner et al. |

OTHER PUBLICATIONS

Zhang et al., "Fine-grained Private Matching for Proximity-based Mobile Social Networking", 2012 Proceedings IEEE INFOCOM, pp. 1969-1977, IEEE, Mar. 2012.*

Alsaleh et al., "Improving Matching Process in Social Network Using Implicit and Explicit User Information", Web Technologies and Applications, vol. 6612 of the Series Lecture Notes in Computer Science, pp. 313-320, 2011, Springer-Verlag Berlin Heidelberg.*

Chen et al., ""Make New Friends, but Keep the Old"—Recommending People on Social Networking Sites", Proceedings of the SIGCHI Conference on Human Factors in Computing Systems, pp. 201-210, 2009, ACM.*

* cited by examiner

METHODS AND SYSTEMS FOR SOCIAL MATCHING

CROSS-REFERENCE TO RELATED APPLICATIONS

The present application claims the benefit of priority from U.S. Provisional Patent Application No. 61/715,979, filed Oct. 19, 2012. The entire disclosure of that application is incorporated herein by reference.

FIELD OF THE INVENTION

The present invention is directed to the field of social-matching methods and systems. More specifically, the present invention is directed to methods and systems that enable social matching to be triggered by input of data into a network-connected device.

BACKGROUND OF THE INVENTION

Conventional social matching methods and systems are computer-based platforms that recommend individuals to each other. Such social matching platforms can introduce people both online and in physical spaces, for reasons including, but not limited to, friendship, dating, or professional networking Current social matching solutions cater to subsets of the population that seek connection with others within their population-subset having specific attributes or who are seeking a specific benefit or desired outcome from identifying a matched individual. Such social matching solutions have pre-defined attribute categories allowing users to report their own or their preferred attributes. While such platforms cater to well-defined subsets of individuals, they do not enable individuals to be matched with one another across different subsets of the general population based on a plurality of attributes. Further, having a limited subset of individuals and a limited scope of matching attributes with which to match individuals, the outcomes from social matching are limited, on average, to a well-defined and narrow set of benefits or outcomes for the users. Therefore, current social matching solutions are limited in that they do not address enhancing a range of benefits to individuals resulting from matches. In addition, these platforms can quickly become stale if incentives are not present for individuals to maintain and regularly update their profiles in order to identify new individuals with whom they have not yet been matched. Therefore, there is a need for social matching systems and methods that address matching individuals across the larger general population and that enable matching based on a multitude of attributes and social matching outcomes.

Social matching platforms rely on many factors in order to determine what constitutes a good match. These can include, but are not limited to, attributes such as demographics, user-selected interests, educational background, physical features, and behaviors. These matching factors may be entered by the user, observed by the system, or acquired from external sources such as third parties. For example, an existing social media profile may provide matching factors or attributes. Such approaches to collecting attributes for the purpose of social matching have been limited to an available set of attribute categories associated with a given social matching platform. In these instances, the attribute categories do not address the needs of individuals who seek social matches that lie outside the scope of a platform's given set of attribute categories. Therefore matching platforms and matching factors are restricted to finding other individuals in the social matching service rather than finding third parties, groups or organizations of interest. For example, current platforms are limited in determining if a location, a group, a website, an item, an experience or an event is presently or has been historically frequented by others with whom an individual may be matched. Furthermore, current social matching platforms calculate an affinity or matching score then entities with a score that exceeds some threshold parameter are presented as viable matches to the end user. The details of the match analysis are not disclosed to either entity of the potential match, which makes it difficult to evaluate the match performance or to tailor results for specific objectives. Therefore, current platforms are limited in their ability to enable matching based on a wide-ranging set of parameters and motives and do not provide a detailed match analysis output containing all of the matching attributes and the relative values of each attribute.

Social matching methods and systems typically provide users with access to a mechanism for facilitating introductions with other people. This mechanism is generally available through online websites or through software applications for mobile devices such as smartphones or tablet computers. The mechanism may be as simple as a listing of potential matches or may include search capabilities to further refine the result set. These platforms are limited, however, in that they may not enable multiple modes of one-to-one connectivity between matched individuals. Furthermore, such connectivity does not address having multiple formats of connectivity, privacy settings for communications and discretion with regard to identity revelation between matched individuals. While some individuals are unconcerned with regard to privacy and identity, others prefer anonymity and privacy in communicating with matched individuals. In addition, many social matching platforms reveal the identities of users and provide access to full user profiles of potential matches or identified matches. There are few provisions made to maintain privacy or anonymity among matched individuals. Therefore there is a need for social matching methods and systems that address privacy concerns with regard to communications, identities, and user profile data access.

The triggering of a match analysis can be initiated by the system or by one or more individuals. Current social matching platforms typically alert individuals when they have been matched by the system such that both individuals become aware of each other as a match. There are a number of drawbacks to alerting both parties that a match has been made. For example, if one individual does not find the match desirable, they will be less likely to find the system useful and thus will be less likely to use the platform, or, in cases of matched lists, they may wish to remove the match from their list but may hesitate in doing so if the other individual can become aware of the action taken. Therefore systems and methods that incorporate discretion in qualifying potential matches are desired. These systems and methods would provide for social matching wherein the identified matches are not notified when they have been matched with a match-requesting individual. This enables the match-requesting individual to privately determine if the match is desirable and keep the match or, if the match is undesirable, to remove the match. Therefore, a platform that addresses this drawback may enable different levels of matched-awareness. For example, one party (e.g., the match-requesting party) or if desired, in some instances, two parties (e.g., the match-requesting party and the matched party) may be notified of the match.

Social matching systems utilize a process or algorithm to analyze the matching factors of one individual against all other individuals in order to determine suitability for a match. This process is generally executed on a periodic basis not correlated to when users access the system via the introduction mechanism. These systems are limited, however, since static or batch service matching requests by a social matching system do not enable dynamic user-initiated match requests. Some matching systems rely on physical proximity to alert pre-matched users for a potential introduction, however, this requires both users to have systems actively in use that share or broadcast their location. In addition, an area of concern in social matching systems is the timing upon when match analyses are performed. The social, contextual, historical, and other attributes that together form a user profile may be updated at any time and may be updated many times. A user's history of attributes and this, user profile can be assumed to be changing from moment to moment. Therefore, systems and methods that provide an on-demand or real-time user-initiated requesting capability while using the most recent available user profile attributes and contextual data and without the need for more than one user to be actively engaged on the platform are desired.

There is therefore a need for systems and methods that overcome some or all of the previously delineated drawbacks and limitations of prior social matching platforms, which provides for a social matching platform addressing wide-ranging social needs of the general population with flexible, customizable settings that incorporate the preferences or desired outcomes of different users including individuals or groups.

SUMMARY OF THE INVENTION

It is often perceived that unknown individuals passed by or briefly interacted with are "strangers" and are likely irrelevant to one's own interests. When meeting new people or waiting in a public location where other people are also present many individuals experience difficulty in finding topics to discuss with a new acquaintance or what commonalities are shared with others. Individuals also often travel to new destinations where they are unaware of which venues such as restaurants, parks, stores, or beach spots are frequently visited by people in their age range or people with the same interests, taste in food or music, finances, handicaps, or beliefs. Therefore, people also often experience difficulty when visiting or moving to a new location, attending conferences, meeting desired outcomes or coming to a decision about a subject such as deciding on which restaurant to choose, school to attend, group to join, among many other decisions. In addition, an individual's private information is easily compromised by a variety of mechanisms. People who would like to engage in a social matching platform may be less inclined to do so particularly when they feel that their information such as identity or personal data are shared indiscriminately, without their consent, or without their prior knowledge with others.

Thus, in addition to overcoming the delineated drawbacks of previous social matching platforms, an object of the present invention is to enable individuals to better connect with their surroundings and the people or groups around them now, at a given point in time, or over a period of time. In this regard, the present invention facilitates the enhancement of interactions with others and the enrichment of daily life through a social matching method and system.

Another object of the present invention is to help determine what an individual or group has in common with another individual, whether they are online, in-person, or have historically frequented the same location, performed the same task or attended the same event.

Another object of the present invention is to provide a user to be in control over when matches are conducted and for what purpose they are conducted. For example, the invention enables flexible and dynamic social matching since matching and subsequent information that is retrieved or related to a match analysis can depend on a user's specific needs, desired match type or criteria, or desired outcome, at a given time or location.

The present invention is directed to social matching and provides a method, a computer-readable medium for a program containing a computer readable code, and a system for social matching utilizing a user profile representation and a user device. Exemplary embodiments in accordance with the present invention will provide for using one or more entity identifiers associated with attributes related to a user profile in order to initiate and perform a match analysis, where the match analysis results in the discovery of matches or recommendations for a match-requesting entity. Entity identifiers can be used as representations of a user's identification and are associated with a user profile or a user account. An entity can include but is not limited to users such as, one or more individuals, one or more organizations, one or more groups, one or more locations and one or more events. An identifier can include but is not limited to digital media or files such as image, video, audio, direct signals and device electronic signatures. A match analysis can include processing entity identifier related attributes in order to calculate and produce matching scores. A match analysis may also include qualifying or ranking matches depending on closeness of match or proximity of matching scores.

According to one aspect of the present invention, a method for social matching and a computer readable medium for a program containing a computer-readable code that when read by a computer causes the computer to perform the method for social matching are provided. The method includes the following steps: receiving one or more entity identifiers on a first user device associated with a requesting entity; transmitting a match request from a requesting user device associated with the requesting entity to a match server; retrieving entity identification, contextual data and a plurality of attributes associated with either of the requesting entity or a third party entity, and for the one or more entity identifiers from one or more databases; performing at least one match analysis, the at least one match analysis comprising calculating matching scores and identifying matches between the retrieved entities and a requesting entity; formatting a match analysis output, the match analysis output comprising the results derived from the performed match analysis; and transmitting the match analysis output from the match server to the requesting user device.

In one embodiment, an entity identifier can include in whole or in part, and is not limited to, a name, a text, a keystroke sequence, a location, a QR code, a barcode, indicia, a code, a video, an image, a sound, an audio recording, a URL, a biometric signature, a medical or health-related signature, a biomarker, a near field communication signal, or any combination thereof. Therefore, an entity identifier may conceal the true identity of an entity. For example, in the case that the entity is an individual, the entity identifier may be used to retain anonymity and privacy regarding the individual's true identity, contextual data and attributes. In one embodiment, an attribute can include and is not limited to demographic information, interests, preferences, educational background, physical attributes, medical or health-related information, biometric signatures, or any combination thereof. Attributes associated with an entity identifier can be gathered by any of entity-reported data, third-party reported data, observation-based data, or combinations thereof. Contextual data can include and is not limited to a location, a range, a surrounding, an individual, an item, an event, an experience, or combinations thereof. Entity identification can include and is not limited to user account information or user profile information.

In one embodiment, the step of transmitting entity identifiers to the match server can be performed on-demand by the requesting entity such that the match request can be performed at a desired time, location or for a specific purpose. A third party entity can include any entity for which the requesting entity seeks to find matching entities. For example, in the instance of gift-giving, the requesting entity may seek to find matching entities for the gift receiver (a third party entity) such as a family member, friend, group, or any other entity. The matching entities can then assist the requesting entity in discovery of a suitable gift for the gift receiver.

In one embodiment, the step of receiving the one or more entity identifiers on the user device associated with a requesting entity comprises triggering the social match analysis to be performed on-demand. Therefore, the requesting entity can be in control over when a match analysis is triggered. This mode of social matching enables all current information to be accounted for when a social match is performed. In one embodiment, the step of receiving one or more entity identifiers on the first user device associated with the requesting entity can include storing the one or more entity identifiers on a volatile memory, a non-volatile memory, or a storage device associated with the user device. A storage device can include any suitable storage device configured to store data. In this instance, an entity identifier may be received on the user device and stored for triggering a social match at a later time. For example, the requesting entity may not have access to a given network or may wish to wait until a more appropriate time for requesting the match analysis. Alternatively, the requesting entity may wish to store the entity identifier for transferring to another user device which will be used to trigger the social match analysis.

The method may include preparing a match request package at the requesting user device, the match request package comprising any of the one or more entity identifiers, a location of the request, matching criteria, user device information and combinations thereof. The requesting user device can include any suitable user device associated with the requesting entity such as the first user device or another user device. Matching criteria can include any of a type of match request (e.g., one-to-one such as one entity seeking to match with one entity, or one-to-many as in one entity seeking to match with a plurality of entities), a matching mode (e.g., individual-to-individual, group-to-location, etc.) the originating requesting user device information and combinations thereof.

In another embodiment, the step of transmitting a match request from the requesting user device associated with the requesting entity to a match server can include transmitting the match request to a network using a suitable network connection. Suitable networks can include local area networks ("LAN"), a wireless local area networks ("WLAN"), an Ethernet network, a wide area network ("WAN"), a cellular network, secure local and wide area networks, secure wireless networks, enterprise-wide networks, storage area networks, virtual private networks, secure virtual private networks, internet, internet area networks, internet secure networks, personal area networks ("PAN"), other communication network, and combinations thereof.

The step of retrieving entity identification, contextual data and a plurality of attributes associated with either of the requesting entity or a third party entity, and for the one or more entity identifiers from one or more databases can include retrieving any of entity identification, entity attributes, account information and combinations thereof. The step of performing the one or more match analyses can include assigning a relative value to matched attributes, the relative value of the matched attributes used in calculating a matching score. The matching score can be used to present matches or recommendations. The step of formatting the match analysis output can include formatting the output data according to the matching criteria and the requesting entity user device output formatting. Therefore, in addition to presenting matches, match analyses can also include recommendations.

Furthermore, the method of the present invention can include displaying the match analysis output as a match analysis report on the requesting user device associated with the requesting entity, the match analysis report is displayed in any of audio format, visual format, digital format, textual format, graphical format and combinations thereof. Audio format can be a live or recorded audio format, visual format can include icons, avatars, or any suitable visual format, digital format can include codes, passwords, or other suitable digital format. For example, codes can be used to access matched entity information, icons or avatars can be used to represent entities or convey information about entities such as attributes. The method can also include displaying one or more matched entities and the corresponding one or more matched attributes across either of the requesting entity or a third party entity and the one or more matched entities, where matched attributes can include shared attributes, different attributes or desired attributes. Therefore, in one embodiment, only shared matched attributes can be presented to the requesting entity. This is in contrast to sharing an entire user profile with the requesting entity and can be a desirable privacy mode. In addition, once a match analysis is performed and matches are identified, the matched entities can be removed if the requesting entity deems that they are unsuitable. In such an instance, the method can be executed such that matched entities do not become aware that they have been matched with the requesting entity or that they have been removed from the requesting entities match list. In another embodiment, the method includes initiating one-to-one connectivity between any of the requesting entity, the third party entity and one matched entity. In this instance, each of the requesting entity, third party entity, and matched entity is equipped with a suitable communications device that is connected to a suitable network for communication. Therefore, one-to-one connectivity can include and is not limited to any of electronic mailing, SMS text messaging, online chat, video conferencing and combinations thereof.

According to another aspect of the present invention, a system for social matching is provided. The system includes: a user device, the user device in communication with one or more suitable networks; at least one receiving mechanism to receive one or more entity identifiers, where the at least one receiving mechanism can include any of a camera, a lens, a microphone, a sensor, a receiver, a USB flash drive, and combinations thereof; at least one stored computer-readable medium component containing a computer-readable code that when read by a computer causes the computer to perform a method for social matching; a match server, the match server configured be in communication with the user device; and at least one database, the at least one database can include any of entity identification, contextual data, attribute data and combinations thereof.

In one embodiment, the user device can be in communication with the at least one receiving mechanism, where the receiving mechanism is configured to receive and transmit one or more entity identifiers to the user device. The receiving mechanism can be internal to the user device such as a device resource, connected to the user device, or in communication with the user device. Any suitable computer program, language or syntax can be utilized to receive and transmit entity identifiers from the environment to the receiving mechanism or device resource and from the receiving mechanism or device resource to the user device. In another embodiment, the at least one stored computer readable medium component containing a computer-readable code that when read by a computer causes the computer to perform a method for social matching can be stored on any of the user device, the receiving mechanism, the match server, the at least one database and combinations thereof.

The match server can be in communication with one or more data processing resources such as any suitable device having a processor and processing capability such as computer, a server, or any other processing resource. The match server or the one or more data processing resources can be configured to receive entity identifiers from the user device, search and retrieve entity attributes associated with the received entity identifiers from the at least one database, perform one or more match analyses to derive a match score between received entity identifiers and the requesting entity, format the one or more match analysis outputs for the user device type, transmit the formatted one or more match analysis outputs to the user device, and display the one or more match analysis reports on the user device. The stored computer readable medium component can allow any of receiving, transmitting, processing, retrieving, matching, storing and formatting of entity identifiers, match analysis output, match analysis reports, or entity attributes.

The user device can include an interface component where the interface component enables any of entering, storing, retrieving, visualizing, accessing or communicating information. The match server can be configured to receive, process, retrieve, transmit, match, store any of entity identifiers, match analysis output, match analysis reports, entity attributes or combinations thereof. Entity profile data or entity account data may include the information related to a given entity using the social matching system such as entity identification, entity attributes, entity match requests, and entity contextual data. In another embodiment, the match server can be configured to search and retrieve entity attributes associated with the received entity identifiers from the at least one database, perform one or more match analyses to derive a match score between received entity identifiers and the requesting entity, format the one or more match analysis outputs for the user device type, transmit the formatted one or more match analysis outputs to the at least one user device, and display the one or more match analysis outputs as a match analysis report on the user device.

Therefore, the present invention ties the entity identifiers to entity identification, contextual data, or a plurality of attributes, allowing the entity identifiers to be used in performing a social match analysis, running social matching applications from the originating requesting device while maintaining privacy and optionally without requiring the entirety of matched entities profiles to be accessible. Methods and systems in accordance with the present invention can allow on-demand social matching for identifying individuals, groups, locations, time and location, events, experiences, items and other purposes, with appropriate attribute data or other information coupled with the entity identifier to facilitate a near seamless social matching experience. The present invention also enables multiple modes privacy and of connectivity between matched entities.

DETAILED DESCRIPTION

Figure 1:
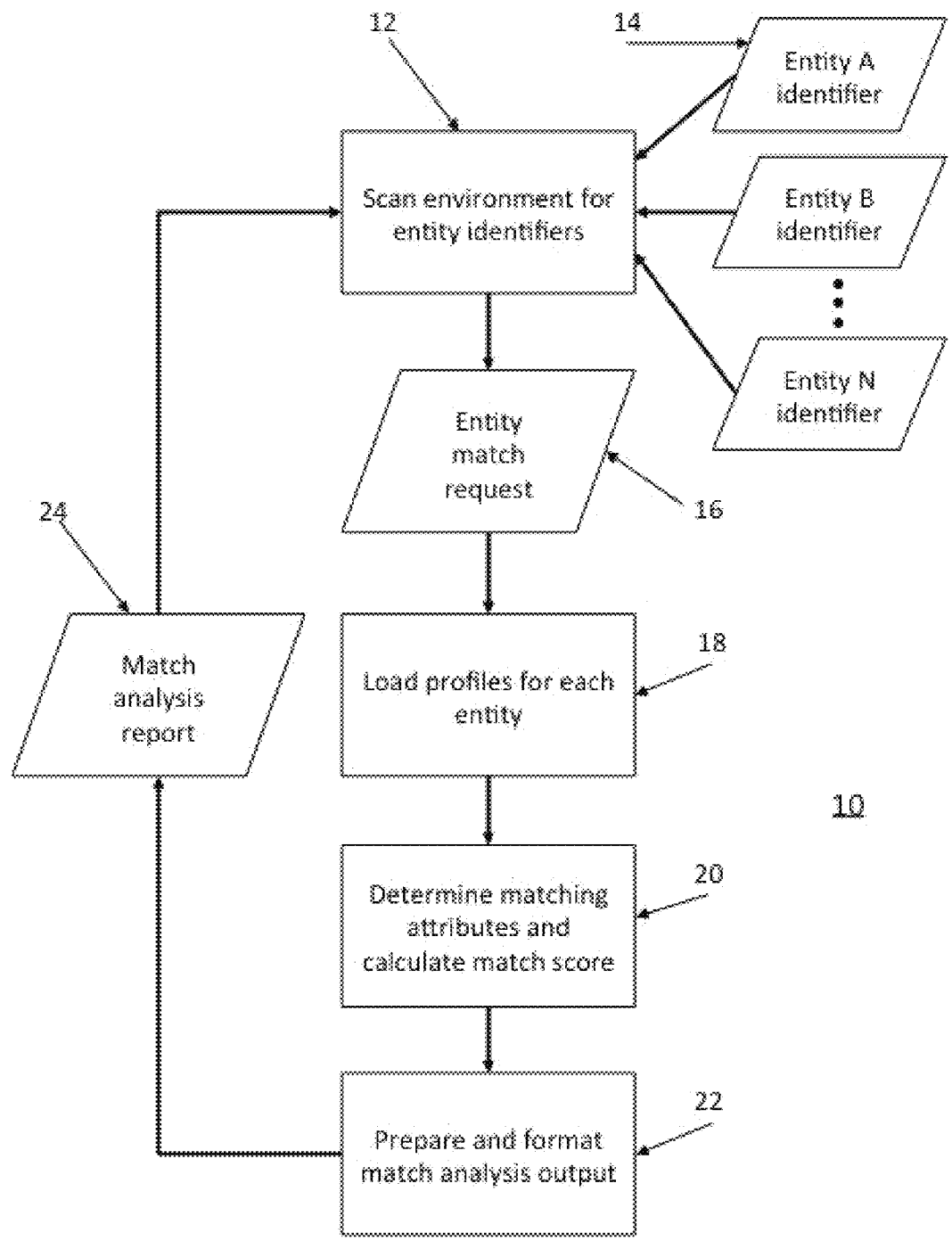
FIG. 1 is a flow chart illustrating an embodiment of a method for providing triggered matches for matching entities.

Referring initially to FIG. 1, a flowchart of a method, indicated generally at 10, in accordance with the present invention is shown. The method may be performed by the systems of the present invention in order to trigger a match analysis and deliver details of the analysis back to an originator via a match analysis report. The originator can include, but is not limited to a requesting user device, an interface, or any suitable requesting device. The requesting user device can include the match-requesting entity's user device. Beginning at 12, any suitable user device such as a network-connected device (e.g., a computer, a mobile phone, a tablet computer, a proprietary reader, Google Glass, iWatch, or any other suitable device) scans the local environment (e.g., an individual, a group, a location, an area or combinations thereof) for any suitable entity identifiers 14, which may include, but are not limited to, printed numeric or graphical codes (e.g., barcodes or two dimensional QR codes), digital signatures via a suitable wired or wireless broadcast transmission method (e.g., Bluetooth, RFID, Wi-Fi, near field communications signals, or combinations thereof), or audio signatures such as musical tones or spoken word. Entity identifiers can relate to any of an individual, a group, a location, a time, an item, a gift, an experience, an event, content, an attribute and combinations thereof. The entity identifiers are packaged into a match request 16 along with additional information that may include the location of the request, the type of match request such as one-to-one or one-to-many, the match mode or desired matching entity, and the originating device type for proper output formatting.

At 18, the matching system retrieves the attribute details for each entity included in the match request. At 20, the matching system determines the attributes that are shared in common between the entities and calculates a matching score based on relative values associated with each of the matched attributes. Relative values can be any values that are assigned to a matched attribute. Various relative values can be assigned to a matched attribute dependent on the desired match type or match criteria of the social matching platform or of the social match requesting entity. For example, a requesting entity may rank attributes in order of importance for which they are seeking matching entities or recommendations. The matched entities are identified upon analysis of the matched attributes and subsequent scoring of the matched attributes in accordance with the ranking of matched attributes or their relative values. The results of the match analysis are formatted based on criteria of the match request at 22, and the objective of the matching system and sent back to the originating match-requesting user device as the match analysis report 24. The match analysis report can be displayed in textual, graphical, visual or any suitable output format on the user device. In one exemplary embodiment, the match analysis report 24 can be displayed on an interface such as a graphical user interface (GUI) associated with the user device or any other suitable device having access to the match analysis report. The interface enables visualizing in textual, graphical, or any suitable format, the social matching results.

In one embodiment one or more scanned entity identifiers may be stored for triggering social matching at a later time. In such cases, network connectivity may or may not be available. However, even if network connectivity is available, in this embodiment, it may be desirable to store the entity identifier for later use. Storage of the entity identifiers can be achieved on any suitable storage device or method including volatile or non-volatile memory associated with the user device or an external device in communication with the user device. Volatile memory can include any random access memory (RAM) and non-volatile memory can include any read-only memory (ROM) or non-volatile RAM. Alternatively entity identifiers can be stored on an external storage device or database until retrieved by the requesting entity or the user device to trigger a social matching process. In one instance, the scanned entity identifiers can be stored on a first user device and subsequently transferred to another user device. In this case, the transferred entity identifiers can be stored, transferred, or used to trigger the social match analysis.

Suitable requesting entities include automated entities and individuals or groups that are capable of initiating a social match request using the methods and systems of the present invention. These requesting entities can be broadly categorized as individuals, groups, or businesses and include, but are not limited to individuals, travelers, students, shoppers, parents, families, customers, patients, singles, job seekers, networkers, firms, restaurants, parks, clubs, professionals, groups, and combinations thereof. In general, the requesting entity initiates a social match request for the purpose of obtaining the desired benefits associated with identifying matched entities that include but are not limited to other entities such as individuals with similar attributes, desired attributes or other entities such as locations, businesses, events, experiences, items, gifts or content that are associated with individuals who share similar attributes. Suitable matched entities can include the same or different types of entities as the requesting entity. For example, an individual can be matched with a restaurant, location or group as well as to another individual or for example the requesting entity is a business or institution that provides goods or services and can be matched with groups, restaurants, or to individuals. Examples of matched entities resulting from a match request, in particular include, but are not limited to, an individual, a group, an event, an item, an experience, a company selling products, a university and a park, a destination, a location, a church, a meeting, a conference, a firm, a healthcare provider, and combinations thereof.

In order to provide for the matching of entities to the requesting entity in accordance with the desired social matching service, attribute data to be applied to a social matching request between a requesting entity and a matching entity are accessed by the social matching system. These attributes are an expression of the desired matching criteria, matching outcomes or type of match by the requesting entity from the social matching service as well as an identification of the requesting entity and may include but are not limited to user name, address, phone number, birth date, location, range, preferences, interests, beliefs, schools attended, health data, biometric data, genetic or other biomedical data, biomarker data, family data, a matching mode (an identification of the type of matching desired to be performed), audio data, visual data, security data, authentication data and combinations thereof. Suitable methods for accessing the attribute data may include but are not limited to entering entity-defined attribute data using an interface in communication with the network, automated collection of attribute data through observation of behaviors by the matching system, importation of attribute data from external social networking platforms, third party submission of attribute data and combinations thereof. In another embodiment, the attribute data are defined by selecting at least one attribute from a pre-determined list containing a plurality of attributes. The pre-determined list containing the attributes can be maintained (e.g. by adding new attributes, removing old attributes and modifying existing attributes) by the match requesting entity.

In one embodiment, the attributes are entered or selected by the match requesting entity using the input functionality of the equipment or device used to trigger the social matching. For example, if the requesting entity is using a smartphone, then the attributes are entered as an alpha-numeric string using the keys on the smartphone. Alternatively, the attributes are entered or selected by the requesting entity using a device that is separate from and independent of any device used to trigger the social matching.

Figure 2:
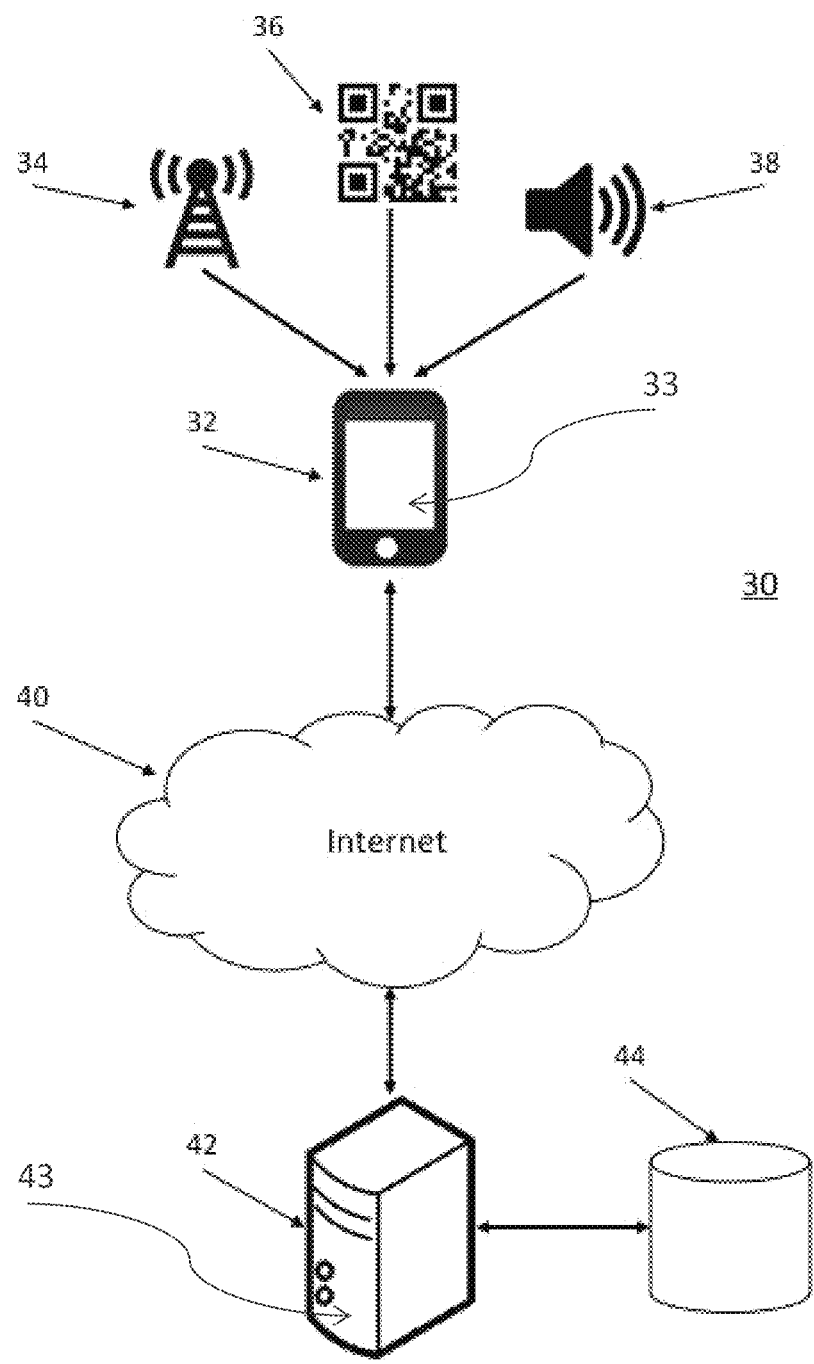
FIG. 2 is a diagram illustrating entity identifiers as input triggers to the hardware and software components of the systems and methods of the present invention.

Referring next to FIG. 2 an exemplary embodiment is illustrated of a method and system for receiving and processing entity identifiers in accordance with the present invention. As shown, the diagram illustrates the hardware and software, indicated generally at 30, of the systems and methods of the present invention and the various representations of entity identifiers that may trigger a social matching process. A device 32 such as a user device connected to a network 40, may be able to receive entity identifiers such as audio, wireless signals, or QR codes, from one or more device resources or receiving mechanisms, such as a microphone, camera, or wireless signal receiver. Alternatively, the device may be connected to or be in communication with external receiving mechanisms. Suitable networks 40 include local area networks ("LAN"), an Ethernet network, a wide area network ("WAN"), secure local and wide area networks, secure wireless networks, enterprise-wide networks, storage area networks, virtual private networks, secure virtual private networks, internet, internet area networks, internet secure networks, personal area networks ("PAN"), other communication network, and combinations thereof. Wireless transmissions 34 such as Wi-Fi, Bluetooth, RFID, etc. may originate from other network-connected devices 32, from any object with an embedded RFID chip, from mobile transmission stations at an event, or from stationary transmission devices at fixed locations (e.g., commercial buildings, arenas, residences, etc.). In one embodiment, a user device 32 with a camera can scan optical representations of entity identifiers 36, such as barcodes, two dimensional barcodes (QR codes), logos, or printed text through optical character recognition. In another embodiment, a device with a microphone can accept audio entity identifiers 38, such as musical tones, spoken words, or the audio output of a television program or film. Once the user device 32 receives the various entity identifiers it transmits a match request via the network 40 to the matching system 42. The matching system 42 includes at least one stored computer-readable code to execute the tasks required by the social matching system, a match server 43 configured to be in communication with the user device 32, at least one database 44 containing entity profile data and an interface component 33 enabling an entity such as an individual to enter, access or visualize social matching information. The matching system 42 retrieves the entity attribute information from at least one database 44 and performs the match analysis, prepares and formats the match analysis output, and sends the match analysis report back to the user device 32 via the network 40. Although illustrated as separate equipment, the functions of the match server 43 and the database 44 can be combined into a single piece of equipment. The one or more databases 44 are provided to store information needed by the social matching system including, but not limited to, entity identification, entity account information, entity attributes and matched entities. Each database 44 can also include the computer-executable code for running methods in accordance with the present invention.

The match server may operate in a networked environment using logical connections to one or more remote computers or devices. The remote computers may be a personal computer, a router, a storage device, or other common network node. The server will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The match server will further include a storage medium for storing a database of user accounts. Further the match server can be in communication with at least one storage device or a plurality of memory locations including but not limited to the cloud, a third party server, multiple servers, a computer, or a user device for storage of user information. In addition, any of the tasks required by the match analysis such as retrieving data, processing data, or formatting match analysis results can be performed at the match server or at another server or computer in communication with the match server.

Any suitable language or syntax that is capable of being read and understood by the device 32 can be used to receive or identify the entity identifiers. Examples of suitable languages include, but are not limited to extensible markup language (XML), computer-readable code, binary code, abbreviations, natural languages, icons, audio signals including Morse code, coded language using, for example, public key infrastructure (PKI), digital signals and combinations thereof.

Figure 3:
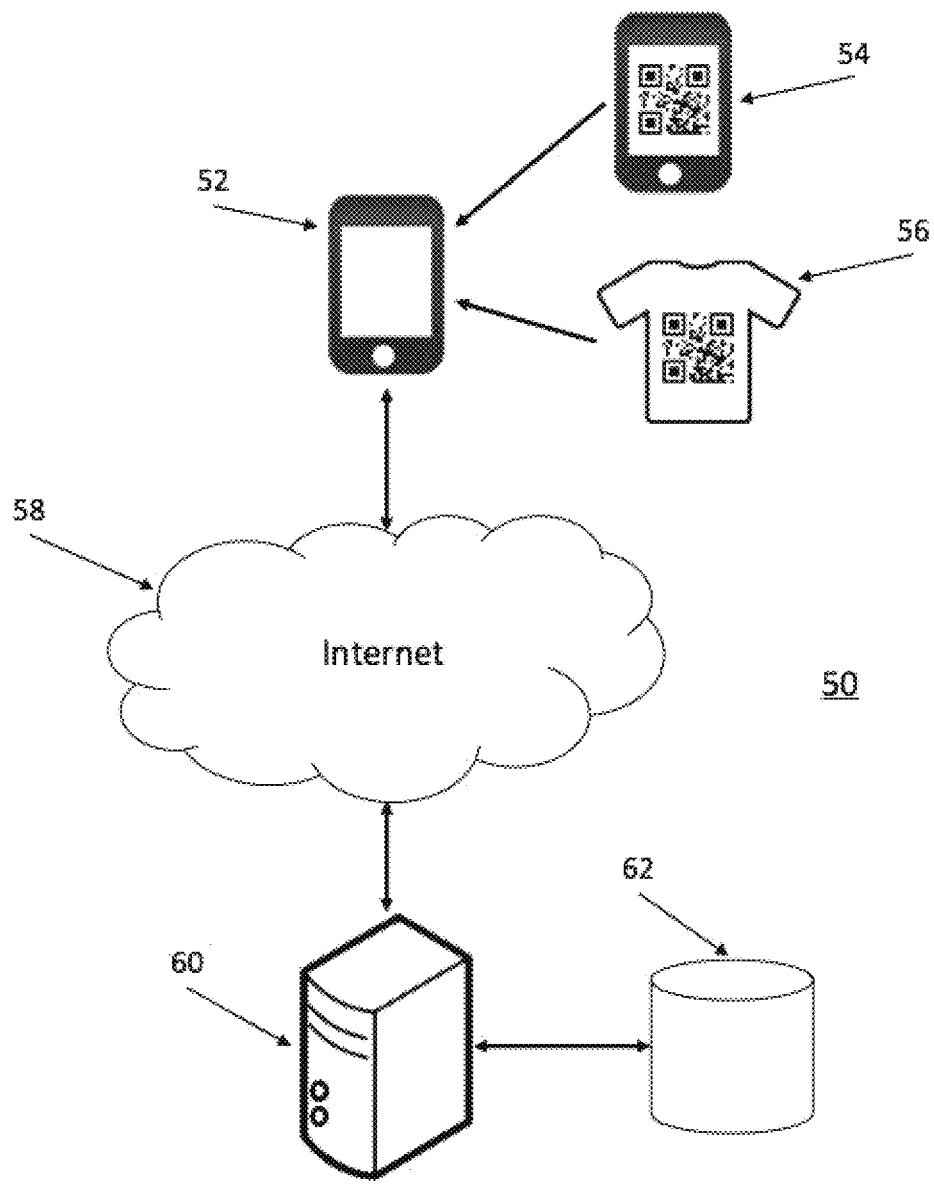
FIG. 3 is a diagram of an embodiment of the methods and systems of the present invention depicting a user device receiving an entity identifier directly from another user device or individual.

Referring to FIG. 3, a diagram illustrating the hardware and software, indicated generally at 50, is shown. The diagram illustrates an exemplary embodiment of the systems and methods of the present invention wherein an individual receives one entity identifier on a user device to trigger a social matching process. A device 52 connected to a network 58, may receive input from one or more device resources or receiving mechanisms, such as a microphone, camera, or wireless signal receiver. Alternatively, the device may be connected to or be in communication with external receiving mechanisms. Suitable networks 58 include local area networks ("LAN"), an Ethernet network, a wide area network ("WAN"), secure local and wide area networks, secure wireless networks, enterprise-wide networks, storage area networks, virtual private networks, secure virtual private networks, internet, internet area networks, internet secure networks, personal area networks ("PAN"), other communication network, and combinations thereof. In this example, a device 52 with a camera can scan optical representations of entity identifiers, such as two-dimensional barcodes (QR codes), displayed on another device screen 54 or printed on apparel 56. Once the network-connected device 52 receives the various entity identifiers it transmits a match request via the network 58 to the matching system 60. The matching system 60 retrieves the entity attribute information from at least one database 62 and performs the match analysis, prepares and formats the match analysis output, and sends the match analysis report back to the network-connected device 52 via the network 58. The one or more databases 62 are provided to store information needed by the social matching system including, but not limited to, entity identification, entity account information, entity attributes and matched entities. Each database 62 can also include the computer-executable code for running methods in accordance with the present invention.

Figure 4:
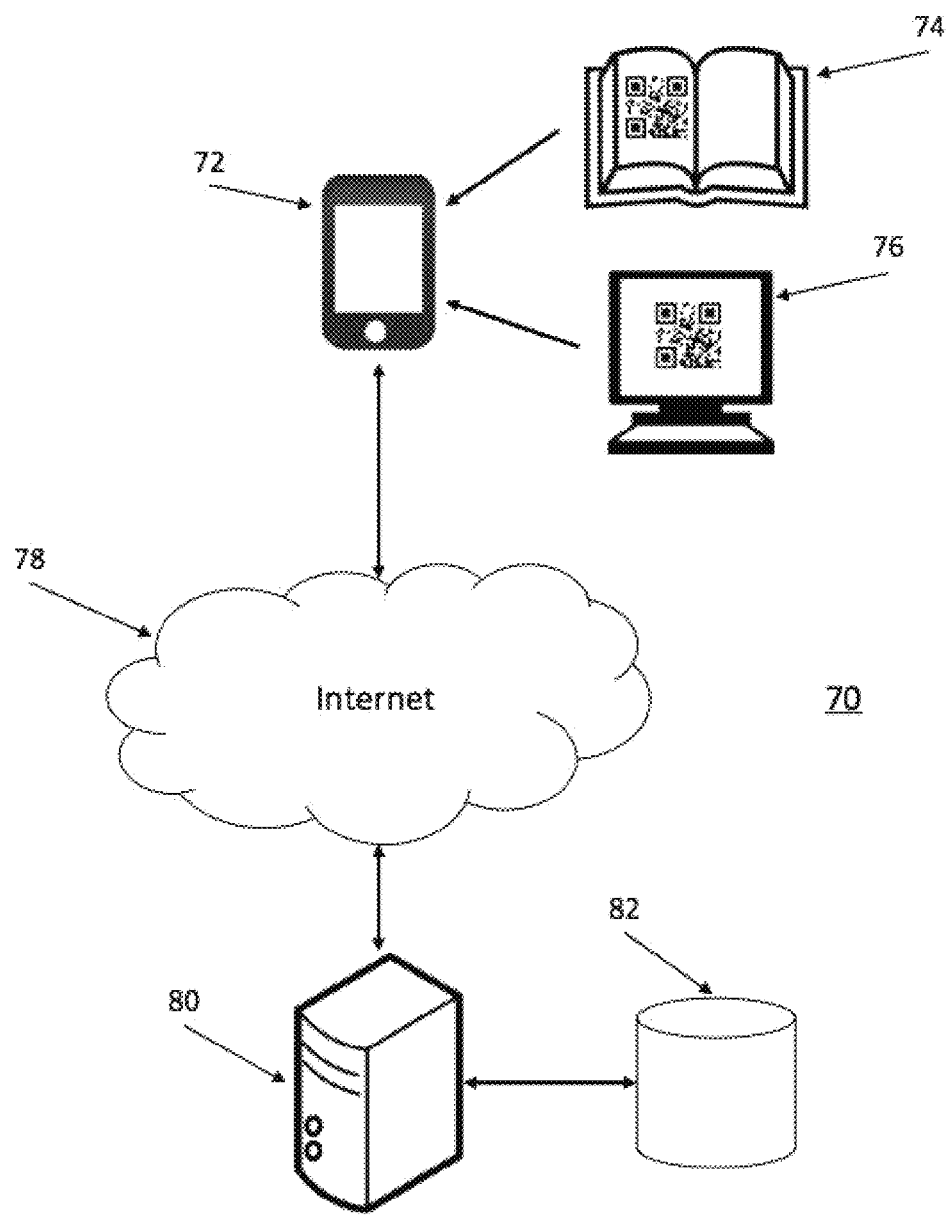
FIG. 4 is a diagram of an embodiment of a method and systems of the present invention depicting a user device receiving an entity identifier indirectly from another individual or user device.

Referring now to FIG. 4, an exemplary embodiment illustrating the hardware and software, indicated generally at 70, is shown. The diagram illustrates an exemplary embodiment of the systems and methods of the present invention wherein an individual- or entity-user device receives an entity identifier from a published source to trigger a social matching process. A device 72 connected to a network 78, may receive input from one or more device resources or receiving mechanisms, such as a microphone, camera, or wireless signal receiver. Alternatively, the device may be connected to or be in communication with external receiving mechanisms. Suitable networks 78 include local area networks ("LAN"), an Ethernet network, a wide area network ("WAN"), secure local and wide area networks, secure wireless networks, enterprise-wide networks, storage area networks, virtual private networks, secure virtual private networks, internet, internet area networks, internet secure networks, personal area networks ("PAN"), other communication network, and combinations thereof. In this example, a device 72 with a camera can scan optical representations of entity identifiers, such as two-dimensional codes (e.g., QR codes), published in printed material 74 or displayed within web content 76. Once the network-connected device 72 receives the various entity identifiers it transmits a match request via the network 78 to the matching system 80. The matching system 80 retrieves the entity attribute information from at least one database 82 and performs the match analysis, prepares and formats the match analysis output, and sends the match analysis report back to the network-connected device 72 via the network 78. The one or more databases 82 are provided to store information needed by the social matching system including, but not limited to, entity identification, entity account information, entity attributes and matched entities. Each database 82 can also include the computer-executable code for running methods in accordance with the present invention.

Figure 5:
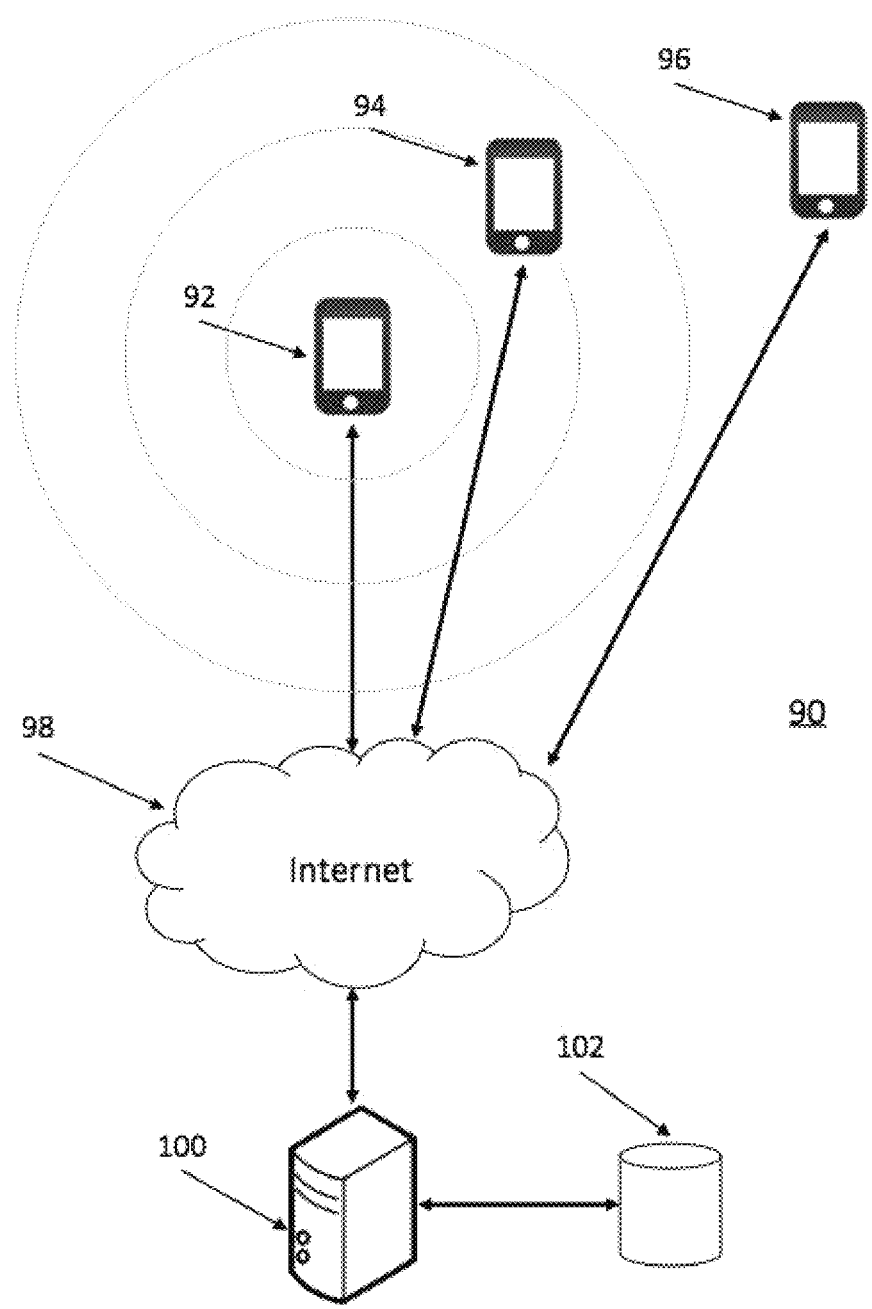
FIG. 5 is a diagram of an embodiment of the methods and systems of the present invention depicting a user device receiving an entity identifier from one or more individuals or groups based on relative location.

FIG. 5 shows a diagram illustrating the hardware and software, indicated generally at 90, of the systems and methods of the present invention. The diagram shows an exemplary embodiment wherein a device receives one or more individual entity identifiers based on relative location to trigger a social matching process. A device 92 connected to a network 98, may receive input from one or more device resources or receiving mechanisms, such as a microphone, camera, or wireless signal receiver. Alternatively, the device may be connected to or be in communication with external receiving mechanisms. Suitable networks 98 include local area networks ("LAN"), an Ethernet network, a wide area network ("WAN"), secure local and wide area networks, secure wireless networks, enterprise-wide networks, storage area networks, virtual private networks, secure virtual private networks, internet, internet area networks, internet secure networks, personal area networks ("PAN"), other communication network, and combinations thereof. In this example, location-enabled devices 92, 94, and 96 are connected and communicating with the matching system 100 via the network 98, sharing their entity identifiers and locations. Device 92 initiates a match request and matching system 100 determines that device 94 is within the configured range and device 96 is beyond the configured location range. The matching system 100 uses the entity identifier for device 94 and retrieves the entity attribute information from at least one database 102 and performs the match analysis, prepares and formats the match analysis output, and sends the match analysis report back to the network-connected device 92 via the network 98. The one or more databases 102 are provided to store information needed by the social matching system including, but not limited to, entity identification, entity account information, entity attributes and matched entities. Each database 102 can also include the computer-executable code for running methods in accordance with the present invention.

Figure 6:
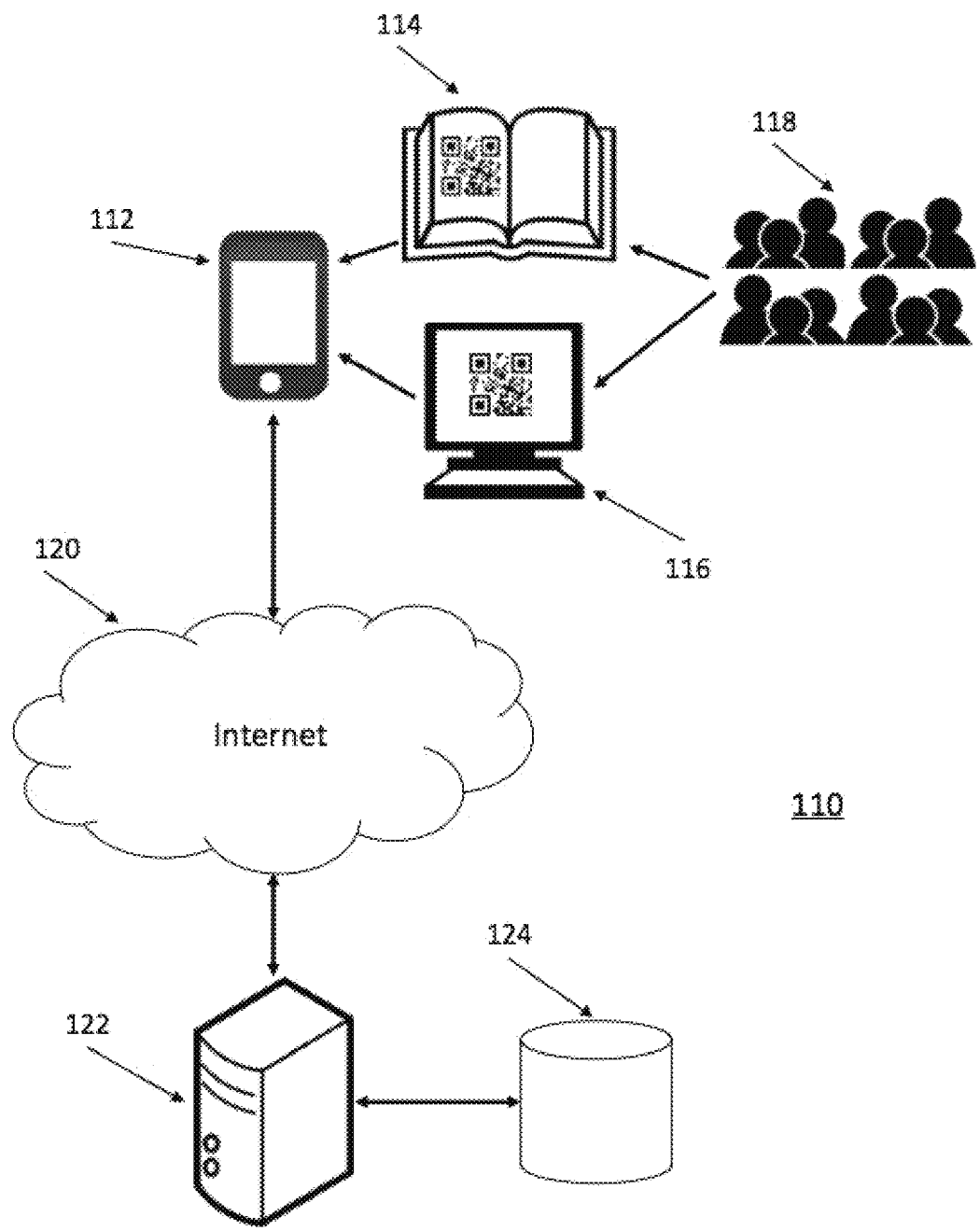
FIG. 6 is a diagram of an embodiment of the methods and systems of the present invention depicting a user device receiving an aggregated group entity identifier indirectly from a published source.

Referring to FIG. 6, a diagram illustrating the hardware and software, indicated generally at 110, is shown for an exemplary embodiment of the systems and methods of the present invention. An individual receives one aggregate group entity identifier indirectly via published means to trigger a social matching process. A device 112 connected to a network 120, may receive input from one or more device resources or receiving mechanisms, such as a microphone, camera, or wireless signal receiver. Alternatively, the device may be connected to or be in communication with external receiving mechanisms. Suitable networks 120 include local area networks ("LAN"), an Ethernet network, a wide area network ("WAN"), secure local and wide area networks, secure wireless networks, enterprise-wide networks, storage area networks, virtual private networks, secure virtual private networks, internet, internet area networks, internet secure networks, personal area networks ("PAN"), other communication network, and combinations thereof. In this example, a device 112 with a camera can scan optical representations of group entity identifiers, such as two-dimensional barcodes (QR codes), published in printed material 114 or displayed within web content 116 that represents an organization, team or other group of individuals 118. Once the network-connected device 112 receives the various entity identifiers it transmits a match request via the network 120 to the matching system 122. The matching system 122 retrieves the entity attribute information from at least one database 124 and performs the match analysis, prepares and formats the match analysis output, and sends the match analysis report back to the network-connected device 112 via the network 120. The one or more databases 124 are provided to store information needed by the social matching system including, but not limited to, entity identification, entity account information, entity attributes and matched entities. Each database 124 can also include the computer-executable code for running methods in accordance with the present invention.

In one embodiment, attributes are entered at the user device as specific keywords or are selected from a drop-down list, requiring minimal processing at the match server. Alternatively, the attributes may by free-form text or data files, requiring more analysis and processing by the matching system match server or any other designated server in communication with the matching system match server.

Various exemplary embodiments in accordance with the present invention are possible depending on the type of match request or matching mode, device and network used. As shown in Table I, matching modes are dependent on the requesting entity and the matched entity and can include, but are not limited, to individual-to-individual, individual-to-group, individual-to-location, individual-to-time and location, individual-to-item, individual-to-gift, individual-to-experience, individual-to-event, individual-to-content, group-to-individual, group-to-group, group-to-location, group-to-time and location, group-to-item, group-to-gift, group-to-experience, group-to-event, group-to-content. A variety of matching modes present numerous types of match requests and numerous potential outcomes resulting from social matching. In general, each matching mode can result in the discovery of any of an individual, a group, a location, a time and location, an item, an experience, an event, content and combinations thereof. Therefore a matching mode can utilize a matched entity to discover or match to another entity that is associated with the matched entity. Any type or format of entity identifier can be utilized to match requesting entities with matching entities.

TABLE I

| EXEMPLARY REQUESTING ENTITY | EXEMPLARY MATCHING/ MATCHED ENTITIES | EXEMPLARY MATCHING MODES |
| --- | --- | --- |
| INDIVIDUAL | INDIVIDUAL | INDIVIDUAL-to-INDIVIDUAL |
| | GROUP | INDIVIDUAL-to-GROUP |
| | LOCATION | INDIVIDUAL-to-LOCATION |
| | TIME & LOCATION | INDIVIDUAL-to-TIME & LOCATION |
| | ITEM | INDIVIDUAL-to-ITEM |
| | GIFT | INDIVIDUAL-to-GIFT |
| | EXPERIENCE | INDIVIDUAL-to-EXPERIENCE |
| | EVENT | INDIVIDUAL-to-EVENT |
| | CONTENT | INDIVIDUAL-to-CONTENT |
| GROUP | INDIVIDUAL | GROUP-to-INDIVIDUAL |
| | GROUP | GROUP-to-GROUP |
| | LOCATION | GROUP-to-LOCATION |
| | TIME & LOCATION | GROUP-to-TIME & LOCATION |
| | ITEM | GROUP-to-ITEM |
| | GIFT | GROUP-to-GIFT |
| | EXPERIENCE | GROUP-to-EXPERIENCE |
| | EVENT | GROUP-to-EVENT |
| | CONTENT | GROUP-to-CONTENT |

In one embodiment, the present invention enables an individual or group to be matched to any of an attribute, individual, group, location, time and location, item, gift, experience, event, or content, based on historical, present, or future information about any of one or more attributes, individuals, groups, locations, times and locations, items, gifts, experiences, events, or content. For example, an individual or group user is matched to individuals or groups that have frequented a given restaurant in the past and share a food allergy. In this instance, any type or format of entity identifier relating to any of an individual, a time, a location, a group, an item, an event, content, an attribute and combinations thereof can be used to discover one or more attributes, individuals, groups, locations, items, gifts, events, experiences, or content, that are associated with the one or more matched individuals or groups. As shown in Table II, exemplary matching modes are segmented into matching variations wherein subsequent matching outcomes can be achieved.

TABLE II

| EXEMPLARY MATCHING MODE | EXEMPLARY MATCH VARIATIONS | EXEMPLARY SUB-VARIATIONS |
|---|---|---|
| INDIVIDUAL-to-INDIVIDUAL | Location | Individual Matched to Individual Based on Location: Worldwide, Regional, City, Close Proximity, Very Close Proximity, Web Address, In-Print |
|  | Time | Individual Matched to Individual Based on Historic, Present, and Future Information of Individuals: At a Location At a Time and Location |
| INDIVIDUAL-to-GROUP | Location | Individual Matched to Group Based on Location: Worldwide, Regional, City, Close Proximity, Very Close Proximity, Web Address, In-Print |
|  | Time | Individual Matched to Group Based on Historic, Present, and Future Information of Groups: At a Location At a Time and Location |
| GROUP-to-GROUP | Direct Match | Group Matches to Group |
|  | Common Denominator | Comparing Two or More Groups to Identify Common Attributes |
|  | Differences | Comparing Two or More Groups to Identify Differences or Missing but Desired Attributes |
| INDIVIDUAL/GROUP-to-LOCATION | Physical Location | Individual/Group Matched to a Location |
|  | Non-Physical Location | Individual/Group Matched to a Non-Physical Location |
| INDIVIDUAL/GROUP-to-ITEM | Items | Individual /Group Matched to an Item |
|  | Gift-Giving/Donations | Individual/Group Matched to a Gift or Donation |
| INDIVIDUAL/GROUP-to-EXPERIENCE or EVENT | Experience | Individual/Group Matched to an Experience |
|  | Event | Individual/Group Matched to an Event |
| INDIVIDUAL/GROUP-to-CONTENT | Media | Individual/Group Matched to Common Media |

In one embodiment, time can relate to any of the historical, present or future information about a given location, individual, group, item, gift, event, experience, attribute and combinations thereof. In another example, time and location information can be utilized to match a user with individuals or groups having children the same ages as the user and visit a section of Central Park at 3:00 PM on Saturdays. The converse is also enabled by the present invention where a user is matched to one or more individuals or groups having children of the same age as the user and that visit a section of Central Park at a given time.

In one embodiment, a user in New York City is matched to a user in Dubai sharing the same disease. In this Individual-to-Individual matching mode, the entity identifier is related to a location which, in this case, is set to a worldwide identifier and the disease is the attribute for which the requesting entity identifies another individual. Alternatively, a location-based entity identifier could be set to a region such as the Northeast United States, a city such as Washington D.C., a close proximity or dynamic location such as a party or an airplane, a web address such as an online news article or blog, or a printed entity identifier such as a QR code for a speaker at a conference. In the instance of an online location, a user reading a blog can be matched with the blogger since they are both, for example, tennis players or share other attributes in common. In another similar instance, a user reading New York City restaurant reviews is matched to New York City restaurant reviews written by people that match their diet or dining preferences (e.g., vegan, gluten-free, etc.). In the instance of a printed entity identifier, a user reading a speaker's biography at a conference can scan, for example, the speaker's entity identifier which may be on a printed document or other printed or published format, in order to determine what they share in common such as same taste in music or same hometown.

In another embodiment, an individual can be matched to a group based on historical, present, or future information about a group. For example, 20% of people that have read a given publication share the users' interest in photography and extreme sports. In this instance, an individual can use an entity identifier relating to information that identifies any of a publication such as media content, a time, a location, a group, an item, an event, an experience, an attribute and combinations thereof to discover groups or locations that are frequented by matched groups. As another example, a user is deciding where to go for an evening out and finds that the group of people standing in a line to enter a nightclub match their music taste and age, therefore having identified that the group shares these common attributes, the user may also wish to stand in that line. Alternatively, a user may find that 80% of an online group which already shares one or more common attributes additionally shares the users interest in snow skiing, or that 20% of students at a given University match the users current profession and interest in golf.

In one embodiment, the present invention may assign an entity identifier to an aggregated group to identify common attributes with an individual or a group. In an alternate embodiment, the present invention aggregates a plurality of user profiles to form an aggregated group based on a given entity identifier in order to perform one or more match analyses. An aggregated group is a group of user profiles that are aggregated based on one or more desired outcomes, common or different attributes. A single user profile then can be aggregated into multiple groups where a group can be represented or identified with a unique entity identifier based on common attributes.

In one instance, the aggregated profiles of a group of medical students match a group of alumni where both groups share the same medical oncology focus. In another instance, two groups are compared to identify common attributes such as when matching a groom and a bride's families, aggregated profiles identify that the majority of individuals from both groups like chocolate cake and classical music. In one instance, different attributes are desired wherein one group is matched with another group to identify missing but desired attributes. For example, a military unit from Fort Bragg is matched with a military unit from Afghanistan to ensure that both units have sufficient tank mechanics.

In one embodiment, a vegan user can match with a restaurant that has vegan items on their menu in an Individual-to-Location matching mode. Similarly, a group of travelers with a common interest in modern art can match with a museum's modern art display in a Group-to-Location matching mode. In another embodiment, matching to an individual or a group non-physical location can, for example, include matching an individual or group of Washington Capital's fans with an online merchant that sells Washington Capitals T-shirts or tickets.

In one embodiment, an individual or group can be matched to an item. For instance, individuals or groups that match a requesting entities level of technology knowledge prefer a specific cell phone or software. In another instance, item matches can identify gifts or donations. For example, individuals that match the style, size or favorite color of a significant other purchased a specific sweater. Similarly, individuals or groups can be matched to experiences such as a sunset sail, events such as an annual meeting a specific resort, or media content such as a news article, television program, or music.

In another embodiment, once at least one match has been made, the present invention enables initiating one-to-one connectivity between any of the requesting entity, the third party entity and one matched entity. In one embodiment, a third party can be an entity that is included in a match analysis by the requesting entity in order to identify similar entities to the third party. One-to-one connectivity can include any suitable mode of communication between entities including but not limited to any of electronic mailing, SMS text messaging, online chat, video conferencing and combinations thereof.

In general, the system used with exemplary embodiments of the present invention can be divided into three subsystems—an end-user subsystem, a transmission subsystem and a processing subsystem. The end-user subsystem can include the functions that are performed by the social matching system utilizing the user device in accordance with the present invention. For example, the end-user subsystem functions may include and are not limited to entering or changing attribute data, selecting a matching mode, scanning the local environment for entity identifiers, storing entity identifiers, initiating a match request, reviewing matched entities, accessing match lists, and combinations thereof. The transmission subsystem can include the functions that are performed by the social matching system in transmitting data through the one or more networks. For example, the transmission subsystem functions may include and are not limited to transmitting entity identifiers to or from the match server, transmitting match requests to a database, transmitting matched entity information to the user device and combinations thereof. The processing subsystem can include the functions that are performed by the social matching system to process data and identify matches. For example, the processing subsystem functions may include and are not limited to processing entity identifiers, storing attribute data, retrieving attributes from a database, calculating matching scores, matching entities formatting match analysis output, sending match analysis output to a network and combinations thereof.

The present invention is also directed to a machine-readable or computer-readable medium containing a machine-executable or computer-executable code that when read by a machine or computer causes the machine or computer to perform a method for social matching in accordance with receiving entity identifiers at a user device in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A non-transitory computer-readable medium containing computer-readable code that when read by a computer causes the computer to:

receive, at a match server, a request from a user device associated with a requesting entity for the requesting entity to be matched to a group associated with a first attribute;

define an aggregate profile for the group based on a plurality of profiles, each profile from the plurality of profiles being of a third party from a plurality of third parties, each profile from the plurality of profiles including an attribute matching the first attribute, the aggregate profile having a plurality of attributes in addition to the attribute matching the first attribute, each attribute from the plurality of attributes defined based on a contribution from an attribute from each profile from the plurality of profiles;

retrieve a profile associated with the requesting entity, the profile including a plurality of attributes;

identify, in parallel, a plurality of matches, each match from the plurality of matches being between an attribute from the profile associated with the requesting entity and an attribute from and the aggregate profile; and transmit a match analysis output from the match server to the user device associated with the requesting entity, the match analysis output including an indication of each attribute from the plurality of attributes associated with the aggregate profile that matched an attribute from the plurality of attributes associated with the requesting entity but not other attributes associated with the aggregate profile that do not match an attribute from the plurality of attributes associated with the requesting entity.

2. The non-transitory computer-readable medium of claim 1, the code further comprising code to cause the computer to:

receive an entity identifier from the user device associated with the requesting entity;

define the profile associated with the requesting entity including the entity identifier and the plurality of attributes associated with the requesting entity, a match from the plurality of matches being between the entity identifier and an attribute from the plurality of attributes associated with the aggregate profile, the match performed on demand in response to receiving the entity identifier.

3. The non-transitory computer-readable medium of claim 1, the code further comprising code to cause the computer to receive a match request package from the user device associated with the requesting entity, the match request package including at least one of an entity identifier, a location, or a matching criteria.

4. The non-transitory computer-readable medium of claim 1, wherein the plurality of attributes included within the profile of the requesting entity includes at least one of an identifier associated with the requesting entity, an interest of the requesting entity, a behavior of the requesting entity, or account information associated with the requesting entity.

5. The non-transitory computer-readable medium of claim 1, wherein a value is associated with each attribute from the plurality of attributes within the profile of the requesting entity and a value is associated with each attribute from the plurality of attributes within the aggregate profile, the code further includes code to cause the computer to:

calculate a plurality of attribute match scores, each attribute match score from the plurality of attribute match scores calculated for a match from the plurality of matches based on the value of an attribute from the plurality of attributes included within the profile of the requesting entity relative to the value of the attribute associated with the attribute included with the profile of the aggregate profile; and calculate a profile match score based, at least in part, on the plurality of attribute match scores.

6. The non-transitory computer-readable medium of claim 1, the code further comprising code to cause the computer to:

format the match analysis output according to at least one of a type of the request, a matching mode, or an output formatting associated with the user device.

7. The non-transitory computer-readable medium of claim 1, the code further comprising code to cause the computer to:

format the match analysis output such that the match analysis output is displayed on the user device in at least one of an audio format, a visual format, a digital format, a textual format, or a graphical format.

8. The non-transitory computer-readable medium of claim 1, wherein the request is received via a network connection.

9. The non-transitory computer-readable medium of claim 1, wherein the first attribute is associated with a behavior.

10. The non-transitory processor readable medium of claim 1, the code further comprising code to cause the computer to:

define a plurality of unmatched attributes associated with the group, each unmatched attribute associated with the aggregate profile not matching an attribute from the plurality of attributes within the profile of the requesting entity, the match analysis output excluding the unmatched attributes associated with each third party entity such that the user device does not receive an indication of the plurality of unmatched attributes for any third party entity.

11. The non-transitory processor readable medium of claim 1, the code further comprising code to cause the computer to:

define a plurality of unmatched attributes associated with the group, each unmatched attribute associated with the aggregate profile not matching an attribute from the plurality of attributes within the profile of the requesting entity, the match analysis output excluding the unmatched attributes associated with each third party entity such that the user device does not receive an indication of the plurality of unmatched attributes for any third party entity, the attribute associated with the aggregate profile that matched the attribute from the plurality of attributes associated with the requesting entity is an attribute associated with a location; and an unmatched attribute from the plurality of unmatched attributes is associated with a name of a third party entity from the plurality of third parties.

12. The non-transitory computer-readable medium of claim 1, wherein the aggregated profile is defined after the request for the requesting entity to be matched to the group is received.

13. The non-transitory computer-readable medium of claim 1, the code further comprising code that when read by the computer causes the computer to:

identify a match between the requesting entity and a third party from the plurality of third parties based on a third attribute of the requesting entity, the match analysis output including an indication of the third party and an indication of the third attribute, the match between the requesting entity and the third party based, at least in part, on the third party being associated with the group.

14. The non-transitory computer-readable medium of claim 1, the code further comprising code that when read by the computer causes the computer to:

identify a location associated with the aggregate profile, the location being a location visited by a subset of third parties from the plurality of third parties, each third party from the subset of third parties being associated with the group, the match analysis output including an indication of the location.

15. The non-transitory computer-readable medium of claim 1, wherein each match from the plurality of matches between the requesting entity and the aggregate profile is not identified based directly on a comparison between the profile associated with the requesting party and a profile of a third party from the plurality of third parties.

16. The non-transitory computer-readable medium of claim 1, wherein the match analysis output does not include other attributes associated with a profile of a third party from the plurality of third parties that do not match an attribute of the profile of the requesting party.

* * * * *